US010979591B2

(12) United States Patent
Kim (10) Patent No.: US 10,979,591 B2
(45) Date of Patent: Apr. 13, 2021

(54) METHOD OF MANAGING IMAGE FORMING APPARATUS BY USING EXTERNAL SERVER AND IMAGE FORMING APPARATUS USING THE METHOD

(71) Applicant: Hewlett-Packard Development Company, L.P., Spring, TX (US)

(72) Inventor: Jin Hyung Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/613,303

(22) PCT Filed: Jul. 26, 2018

(86) PCT No.: PCT/KR2018/008447
§ 371 (c)(1),
(2) Date: Nov. 13, 2019

(87) PCT Pub. No.: WO2019/066232
PCT Pub. Date: Apr. 4, 2019

(65) Prior Publication Data
US 2020/0204697 A1     Jun. 25, 2020

(30) Foreign Application Priority Data
Sep. 29, 2017  (KR) .......................... 10-2017-0127808

(51) Int. Cl.
*G06F 3/12*     (2006.01)
*H04N 1/00*    (2006.01)

(52) U.S. Cl.
CPC ....... *H04N 1/00954* (2013.01); *G06F 3/1204* (2013.01); *G06F 3/1231* (2013.01); *H04N 1/00896* (2013.01)

(58) Field of Classification Search
CPC ........... H04N 1/00954; H04N 1/00978; H04N 1/00992; H04N 1/00896; G06F 3/1204; G06F 3/1231
See application file for complete search history.

(56) References Cited

U.S. PATENT DOCUMENTS

| | | | |
|---|---|---|---|
| 2003/0163747 A1* | 8/2003 | Yoshikawa | ........... G06F 1/3203 713/323 |
| 2004/0042806 A1 | 3/2004 | Dougherty et al. | |
| 2005/0275868 A1* | 12/2005 | Higashiura | ............ G06K 15/00 358/1.14 |
| 2008/0316527 A1 | 12/2008 | Lee | |
| 2009/0298511 A1 | 12/2009 | Paulson | |

(Continued)

FOREIGN PATENT DOCUMENTS

| | | |
|---|---|---|
| EP | 1840727 A2 | 10/2007 |
| JP | 2009-145416 A | 7/2009 |

(Continued)

*Primary Examiner* — Moustapha Diaby
(74) *Attorney, Agent, or Firm* — Jefferson IP Law, LLP (57) ABSTRACT

An image forming apparatus and method for managing an image forming apparatus by using an external server are provided. In various examples, a system environment setting of an image forming apparatus is changed based on context information stored in the external server, without direct intervention of an administrator and without use of additional hardware.

18 Claims, 9 Drawing Sheets

(56) References Cited

U.S. PATENT DOCUMENTS

| | | | |
|---|---|---|---|
| 2011/0046805 A1 | 2/2011 | Bedros et al. | |
| 2011/0310409 A1* | 12/2011 | Yukumoto | H04N 1/00416 |
| | | | 358/1.9 |
| 2014/0056313 A1* | 2/2014 | Wada | H04L 67/145 |
| | | | 370/463 |
| 2014/0297809 A1* | 10/2014 | Kim | G06F 9/541 |
| | | | 709/219 |
| 2017/0310829 A1* | 10/2017 | Kimura | G06F 3/1238 |

FOREIGN PATENT DOCUMENTS

| | | |
|---|---|---|
| JP | 5387360 B2 | 1/2014 |
| KR | 10-2008-0008607 A | 1/2008 |
| KR | 10-2015-0014318 A | 2/2015 |

\* cited by examiner

- HUMIDITY SETTING SERVICE
  - SERVICE ON/OFF
  - OPEN API SERVER ADDRESS
  - SERVER CONNECTION PERIOD SETTING: EVERY DAY, EVERY WEEK, EVERY MONTH
  - LOCATION SETTING
- POWER SAVE SETTING SERVICE
  - SERVICE ON/OFF
  - OPEN API SERVER ADDRESS
  - SERVER CONNECTION PERIOD SETTING: EVERY DAY, EVERY WEEK, EVERY MONTH
  - CALENDAR SETTING

METHOD OF MANAGING IMAGE FORMING APPARATUS BY USING EXTERNAL SERVER AND IMAGE FORMING APPARATUS USING THE METHOD

BACKGROUND ART

The disclosure relates to an image forming apparatus and a method for managing an image forming apparatus by using an external server.

For efficient and effective use of an image forming apparatus such as a printer, system environment setting information of the image forming apparatus may need to be changed according to conditions of a user or a device. If a user without sufficient knowledge changes a system environment setting of the image forming apparatus for this purpose, the corresponding operation will be time-consuming and inconvenient. Also, when a large number of image forming apparatuses need to be managed, there might be a shortage of managing or technician staff for managing all of the image forming apparatuses.

DISCLOSURE OF INVENTION

Brief Description of Drawings

The above and other aspects, features, and advantages of certain examples of the present disclosure will be more apparent from the following description taken in conjunction with the accompanying drawings, in which.

Throughout the drawings, it should be noted that like reference numbers are used to depict the same or similar elements, features, parts, components, and structures.

MODE FOR THE INVENTION

Hereinafter, various examples will be described more fully with reference to the attached drawings. The examples described below may also be modified in many different forms. To more clearly describe the features of the examples, description of details that are well known to those of ordinary skill in the art will be omitted.

In the present specification, when a constituent element "connects" or is "connected" to another constituent element, the constituent element contacts or is connected to the other constituent element not only directly but also indirectly or electrically through at least one other constituent element interposed therebetween. Also, when a part may "include" a certain constituent element, unless specified otherwise, it may not be construed to exclude another constituent element but may be construed to further include other constituent elements.

Expressions such as "at least one of," when preceding a list of elements, modify the entire list of elements and do not modify the individual elements of the list.

While such terms as "first," "second," etc., may be used to describe various elements, such elements must not be limited to the above terms. The above terms are used only to distinguish one element from another.

As used herein, the term "image forming job" may indicate various jobs related to images (e.g., printing, copying, scanning, or faxing), such as forming an image or creating, storing, or transmission of an image file, and "job" may refer to not only an image forming job but also a series of processes necessary for performing an image forming job.

In addition, the term "image forming apparatus" refers to any apparatus capable of performing an image forming job, such as a printer, a copier, a scanner, a fax machine, a multi-function printer (MFP), or a display apparatus.

In addition, the term "hard copy" refers to an operation of outputting an image to a print medium such as paper, and "soft copy" refers to an operation of outputting an image to a display device, such as a TV or a monitor, or to a memory.

Also, the term "content" may refer to any type of data subject to an image forming job such as a photograph, an image, a document file, or the like.

In addition, the term "print data" may refer to data converted into a printable format for a printer.

The term "scan file" may refer to a file generated by scanning an image by using a scanner.

In addition, the term "user" may refer to a person who performs an operation related to an image forming job by using an image forming apparatus or a device connected with an image forming apparatus in a wired or wireless manner. The term "administrator" may refer to a person who has authority to access all the functions and systems of an image forming apparatus. The "administrator" and the "user" may be the same person.

The examples below relate to an image forming apparatus and a method of managing the image forming apparatus by using an external server, and a description of details that are well known to one of ordinary skill in the art, to which the examples pertain, will be omitted.

Figure 1:
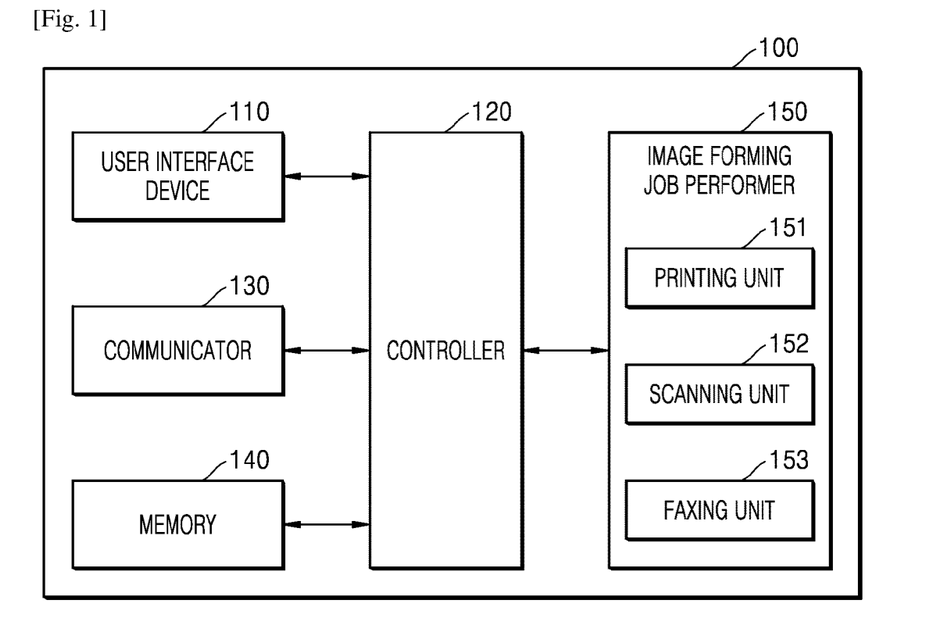
FIG. 1 illustrates a configuration of an image forming apparatus according to an example.

FIG. 1 illustrates a configuration of an image forming apparatus according to an example.

Referring to FIG. 1, the image forming apparatus 100 may include a user interface device 110, a controller 120, a communicator 130, a memory 140, and an image forming job performer 150. Further, although not illustrated, the image forming apparatus 100 may further include a power supply to supply power to respective components.

The user interface device 110 may include an input unit for receiving, from a user, an input or the like, such as for performing an image forming job, and an output unit for displaying information, such as information on a result of an image forming job, a status of the image forming apparatus 100, or the like. For example, the user interface device 110 may include an operation panel for receiving a user input and a display panel for displaying a screen.

In more detail, the input unit may include at least one device capable of receiving various types of user inputs, such as a keyboard, a physical button, a touch screen, a camera, a microphone, or the like. Further, the output unit may include, for example, a display panel, a speaker, or the like. However, the device is not limited thereto, and the user interface device 110 may include a device supporting various inputs and outputs.

The controller 120 controls an overall operation of the image forming apparatus 100 and may include at least one processor such as a central processing unit (CPU) or the like. The controller 120 may control other elements included in the image forming apparatus 100 such that an operation corresponding to a user input received via the user interface device 110 is performed. The controller 120 may include at least one specialized processor corresponding to each function, or may be a single integrated processor.

For example, the controller 120 may execute a program stored in the memory 140, read data or files stored in the memory 140 or store a new file in the memory 140.

The communicator 130 may perform wired or wireless communication with another device or a network. To this end, the communicator 130 may include a communication module, such as a transceiver, supporting at least one of various wired or wireless communication methods. For example, the communication module may be in the form of a chipset, or may be a sticker or a barcode (e.g., a sticker containing a Near-field Communication (NFC) tag) or the like that contains information necessary for communication.

Examples of wireless communication may include at least one of Wireless Fidelity (Wi-Fi), Wi-Fi Direct, Bluetooth, Ultra-Wide Band (UWB), NFC, or the like. Examples of the wired communication may include at least one of, for example, Universal Serial Bus (USB), High Definition Multimedia Interface (HDMI), or the like.

The communicator 130 may be connected to an external device located outside the image forming apparatus 100 and may transmit and receive signals or data.

Figure 2:
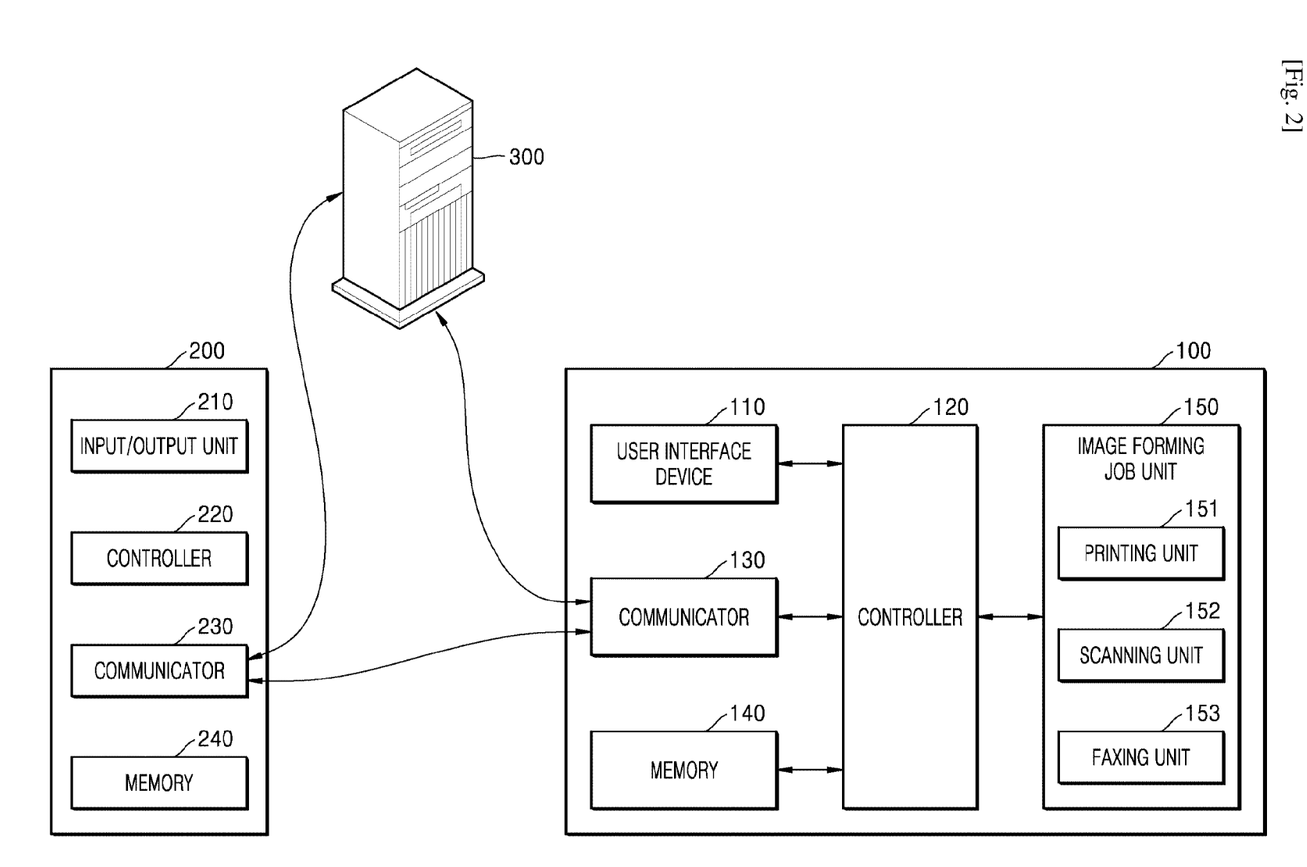
FIG. 2 is a view illustrating an image forming apparatus connected to a user terminal or a server according to an example.

FIG. 2 is a view illustrating an image forming apparatus connected to a user terminal or a server according to an example.

Referring to FIG. 2, the image forming apparatus 100 is connected to a user terminal 200 through the communicator 130. The communicator 130 may transmit signals or data received from the user terminal 200 to the controller 120 or may transmit signals or data generated by the controller 120 to the user terminal 200. For example, when the communicator 130 receives a print command signal and print data from the user terminal 200, the controller 120 may output the received print data through a printing unit 151.

The user terminal 200 may include an input and output unit 210, a controller 220, a communicator 230, and a memory 240. The controller 220 may execute a program stored in the memory 240, and may transmit a signal or data generated as a result of the program execution, to the image forming apparatus 100 via the communicator 230 to control an image forming job. The user terminal 200 may include, for example, a smartphone, a tablet, a PC, a household appliance, a medical device, a camera, a wearable device, or the like.

The communicator 130 may be directly connected to an external server 300 to transmit or receive signals or data. In addition, the communicator 130 may also be connected to the user terminal 200 via the external server 300. That is, the communicator 130 of the image forming apparatus 100 may transmit or receive signals or data to or from the communicator 230 of the user terminal 200 via the external server 300.

Referring back to FIG. 1, various types of data such as files and programs including applications may be installed and stored in the memory 140. The controller 120 may access data stored in the memory 140 and use the data or may store new data in the memory 140. In addition, the controller 120 may execute a program installed in the memory 140. In addition, the controller 120 may install an application received from the outside via the communicator 130, in the memory 140.

The image forming job performer 150 may perform an image forming job such as printing, scanning, copying, or faxing.

Referring to FIG. 1, the image forming job performer 150 is illustrated as including the printing unit 151, a scanning unit 152, and a faxing unit 153. However, according to necessity, only some of these elements may be included or another element for performing another type of image forming job may be further included in the image forming job performer 150. The image forming job performer 150 may include hardware components for performing an image forming job or exclusive software for performing an image forming job.

The printing unit 151 may form an image on a recording medium by using various printing methods such as an electrophotographic method, an inkjet method, a thermal transfer method, a direct thermal method, or the like.

The scanning unit 152 may irradiate light onto a printing medium, receive reflected light by an image sensor, and read an image recorded on the printing medium. A charge-coupled device (CCD), a contact type image sensor (CIS), or the like may be used as the image sensor reading an image from the printing medium. The scanning unit 152 may have a flatbed structure in which a printing medium is located at a fixed position and an image is read as an image sensor is moved, a document feed structure in which an image sensor is located at a fixed position and a printing medium is fed, or a combined structure of these structures.

The faxing unit 153 may share with the scanning unit 152 elements used to scan an image, and share with the printing unit 151 elements used to print a received file, and may transmit a scanned file to a destination or receive a file from the outside.

For example, to transmit a fax document, the image forming apparatus 100 may scan a document by using the scanning unit 152 and generate a fax document, and may transmit the fax document through the faxing unit 153. In addition, the image forming apparatus 100 may receive a fax document via the faxing unit 153, and print a document on a printing medium by using the printing unit 151.

The names of the elements of the image forming apparatus 100 described above may vary. In addition, the image forming apparatus 100 according to the present disclosure may include at least one of the above-described elements, or some of them may be omitted or other additional elements may be further included.

The user interface device 110 may also include an independent control system. That is, apart from the controller 120 of the image forming apparatus 100, a control system for controlling a user interface (UI) provided by the user interface device 110 (e.g., a controller, a memory, or the like) may also be included. In addition, in the control system of the user interface device 110, programs such as an operating system (OS) providing a UI or an application supporting various functions may be installed. As another example, the programs and application may be installed in the memory 140 and accessed by the user interface device 110.

Figure 3:
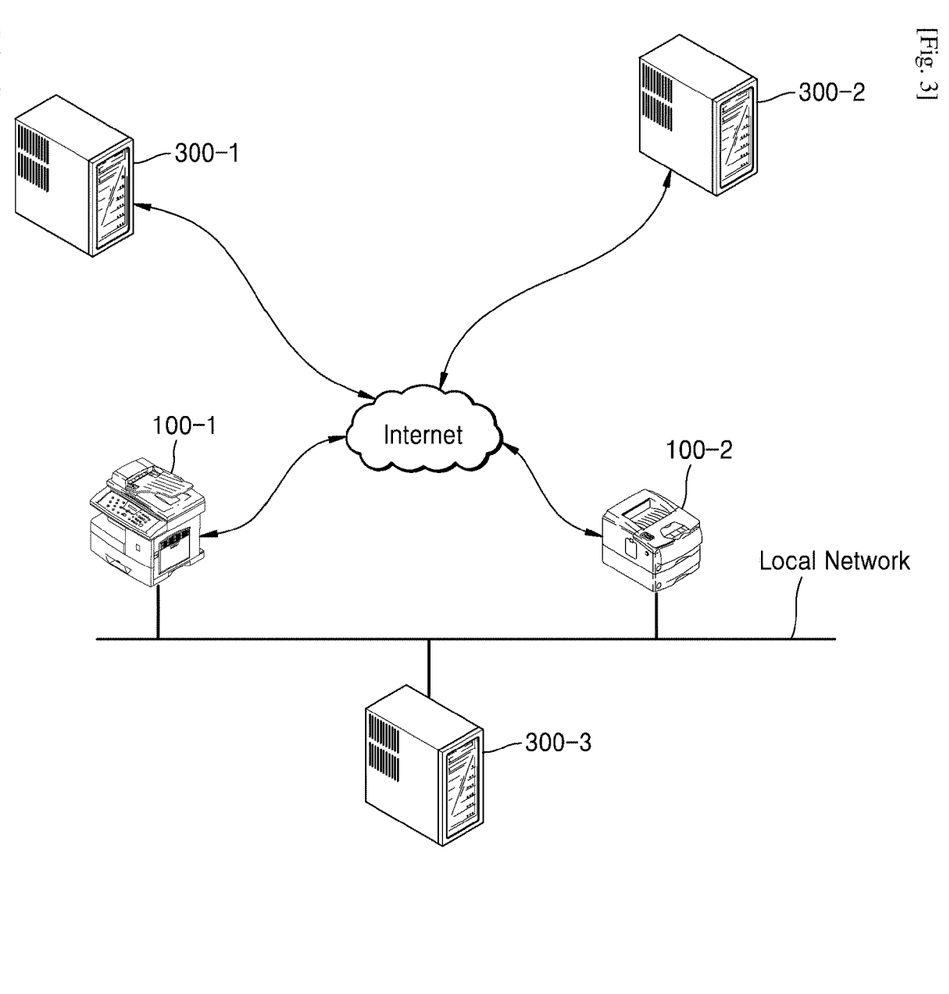
FIG. 3 is a view for describing an environment in which an image forming apparatus is connected to an external server according to an example.

FIG. 3 is a view for describing an environment in which an image forming apparatus is connected to an external server according to an example.

Referring to FIG. 3, external servers 300-1, 300-2, and 300-3 (any of which may be referred to hereinafter as "300") may provide a predefined service, or information that may be used in a predefined service, to an external device. The external server 300 may be an Open API server, a cloud server, a local network server, or the like. The external server 300 may be connected to at least one of an image forming apparatus 100-1 or an image forming apparatus 100-2 via a wired or wireless network environment.

The external servers 300-1, 300-2, and 300-3 may provide various predefined services according to types thereof, and may provide the image forming apparatuses 100-1 and 100-2 with information that may be used in the predefined services. The external servers 300-1, 300-2, and 300-3 may transmit predefined information according to a request by at least one of the image forming apparatuses 100-1 or 100-2 connected to the external servers 300-1, 300-2, and 300-3.

Figure 4:
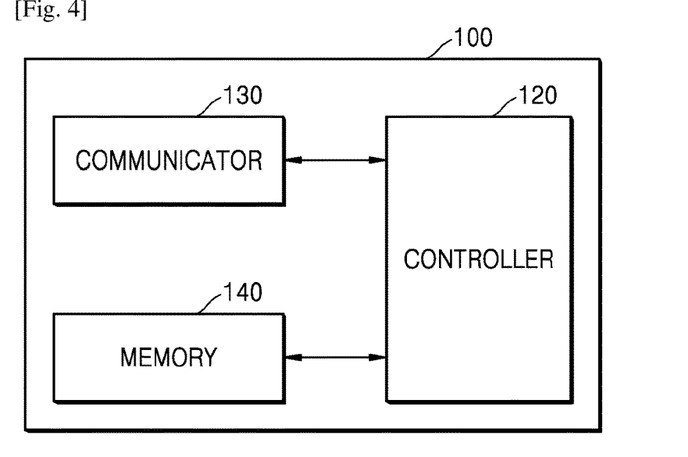
FIG. 4 is a view for describing a structure and operation of an image forming apparatus according to an example.

FIG. 4 is a view for describing a structure and operation of an image forming apparatus according to an example.

Referring to FIG. 4, the image forming apparatus 100 may include a controller 120, a communicator 130, and a memory 140.

When connection requirements for a connection from the image forming apparatus 100 (e.g., 100-1, 100-2 of FIG. 3) to the external server 300 (e.g., 300-1, 300-2, 300-3 of FIG. 3) are met, the communicator 130 may request the external server 300 for context information, and receive the context information from the external server 300. Context information refers to information generated in or collected by the external server 300, the information being provided for or used in a predefined service. Context information may be, for example, a device context indicating a device situation, a user context indicating a user situation, a physical context indicating surrounding situations such as lighting, a noise level, traffic conditions, weather conditions, a temporal context such as time, week, month, or season, or the like.

The communicator 130 may communicate with the external server 300 via a hypertext transfer protocol (HTTP) or a simple network management protocol (SNMP) via transmission control protocol/internet protocol (TCP/IP).

The memory 140 may store computer-executable instructions.

The controller 120 may determine whether to modify system environment setting information of the image forming apparatus 100 based on received context information, and may modify a setting value of the system environment setting information based on a result of the determination.

The controller 120 may predict a context pattern based on a plurality of pieces of context information received from the external server 300, and determine whether to modify system environment setting information based on the predicted context pattern. For example, if there are a plurality of pieces of context information, the image forming apparatus 100 may predict a context pattern based on an extent of change or repetition of data represented by the plurality of pieces of context information or a variation in numerical values.

The controller 120 may modify connection conditions based on details of context information received from the external server 300 or a frequency at which received context information is updated in the external server 300. The controller 120 may determine details of the received context information to adjust a period of connecting to the external server 300 or may adjust a connecting period based on a frequency with which received context information is updated in the external server 300.

The user interface device 110 may provide a setting screen for a system environment setting service and receiving information about a connection from the image forming apparatus 100 to the external server 300 via the setting screen. Information about the connection from the image forming apparatus 100 to the external server 300 may include at least one of connection conditions from the image forming apparatus 100 to the external server 300, an address of the external server 300, information about whether a system environment setting service is used or not, or the like.

Figure 5:
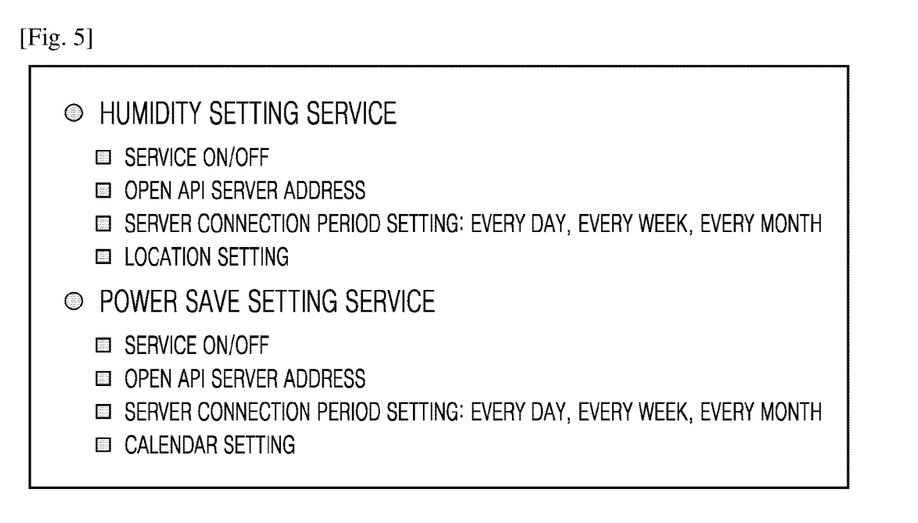
FIG. 5 illustrates a setting screen for a system environment setting service provided by a user interface device of an image forming apparatus according to an example.

FIG. 5 illustrates a setting screen for a system environment setting service provided by a user interface device of an image forming apparatus according to an example.

Referring to FIG. 5, a setting screen for a humidity setting service and a power save setting service is illustrated as an example of a system environment setting service.

In the illustrated example, a portion of the setting screen for a humidity setting service includes items such as an item indicating whether a humidity setting service is used, an address of an Open API server, an item for setting of a server connection period, and an item for a location setting. A user may determine, via the setting screen, whether to use a humidity setting service and input an address of an Open API server to provide weather information such as humidity. In addition, via the setting screen, a connection period may be designated as to how frequently to connect to the Open API server to request context information, and information about a current location of the image forming apparatus 100 may be input.

In the illustrated example, a portion of the setting screen for a power save setting service includes items such as an item indicating whether a power save setting service is used, an address of an Open API server, an item for setting of a server connection period, and an item for selection of a calendar to be used. A user may determine, via the setting screen, whether to use a power save setting service and input an address of an Open API server to provide user schedule information. In addition, via the setting screen, a connection period may be designated as to how frequently to connect to the Open API server to request context information, and a calendar to be used in the power save setting service may be selected.

At least one setting of a system environment setting service may be preset as a fixed value in the image forming apparatus 100.

Hereinafter, various examples of modifying system environment setting information of the image forming apparatus 100 according to a type of the external server 300 and a type of context information received from the external server 300 will be described.

Figure 6:
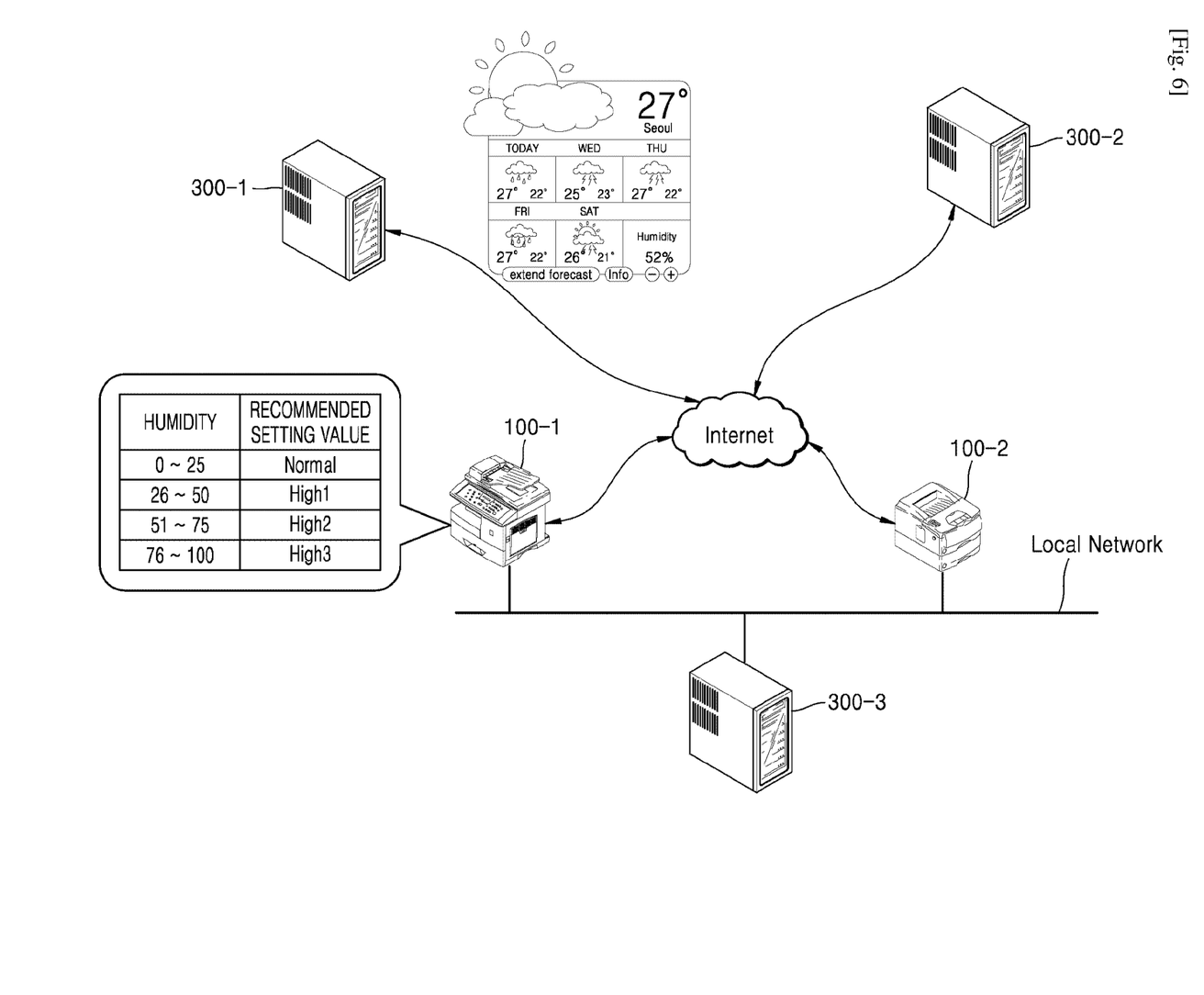
FIG. 6 is a view for describing an operation of modifying device environment setting information of an image forming apparatus based on weather information received from an Open API server included as an external server according to an example.

FIG. 6 is a view for describing an operation of modifying device environment setting information of an image forming apparatus based on weather information received from an Open API server included as an external server according to an example.

Referring to FIG. 6, an example is provided in which an external server 300-1 is an Open API server, and context information is weather information. The external server 300-1, which is an Open API server, provides a weather information service and may transmit weather information to image forming apparatuses 100-1 and 100-2.

The image forming apparatuses 100-1 and 100-2 may determine a new setting value of device environment setting information based on weather information, and when a previously set value of device environment setting information is different from the new setting value, the image forming apparatuses 100-1 and 100-2 may determine to modify the device environment setting information. For example, the image forming apparatuses 100-1 and 100-2 may determine current humidity data from weather information received from the external server 300-1, which is an Open API server, and set a new setting value of device environment setting information corresponding to the current humidity data by using a table in which humidities and recommended setting values of device environment setting information corresponding to the humidities are matched. In the example illustrated in FIG. 6, a current humidity is 52%, and thus, the image forming apparatuses 100-1 and 100-2 may determine "High2" as a new setting value of the device environment setting information. When a previously set value of the device environment setting information is different from the new setting value, the image forming apparatuses 100-1 and 100-2 may determine to modify the device environment setting information. In the example illustrated in FIG. 6, as the new setting value is determined as "High2," when a previously set value is not "High2," the image forming apparatuses 100-1 and 100-2 may modify the device environment setting information.

The image forming apparatuses 100-1 and 100-2 may receive a plurality of pieces of weather information from the external server 300-1, which is an Open API server, and predict a context pattern about weather based on the received plurality of pieces of weather information. For example, the image forming apparatuses 100-1 and 100-2 may receive weather information corresponding to one week which is weekly weather from the external server 300-1, which is an Open API server, and analyze humidity data from a plurality of pieces of weather information to predict a context pattern regarding humidity such as whether a humidify change is temporary or long term, whether humidity is going to decrease or increase, or the like. The image forming apparatuses 100-1 and 100-2 may determine whether to modify device environment setting information based on the predicted context pattern.

The image forming apparatuses 100-1 and 100-2 may modify connection conditions of a connection from the image forming apparatuses 100-1 and 100-2 to the external server 300-1, which is an Open API server, based on details of received weather information or a frequency with which received weather information is updated in the external server 300-1. For example, the image forming apparatuses 100-1 and 100-2 may set a short connection period for a connection from the image forming apparatuses 100-1 and 100-2 to the external server 300-1, which is an Open API server, when details of received weather information have abruptly changed or a frequency with which weather information is updated in the external server 300-1 increases. On the contrary, the image forming apparatuses 100-1 and 100-2 may set a long connection period for a connection from the image forming apparatuses 100-1 and 100-2 to the external server 300-1, which is an Open API server, when details of received weather information have hardly changed or the frequency with which weather information is updated in the external server 300-1 decreases.

Figure 7:
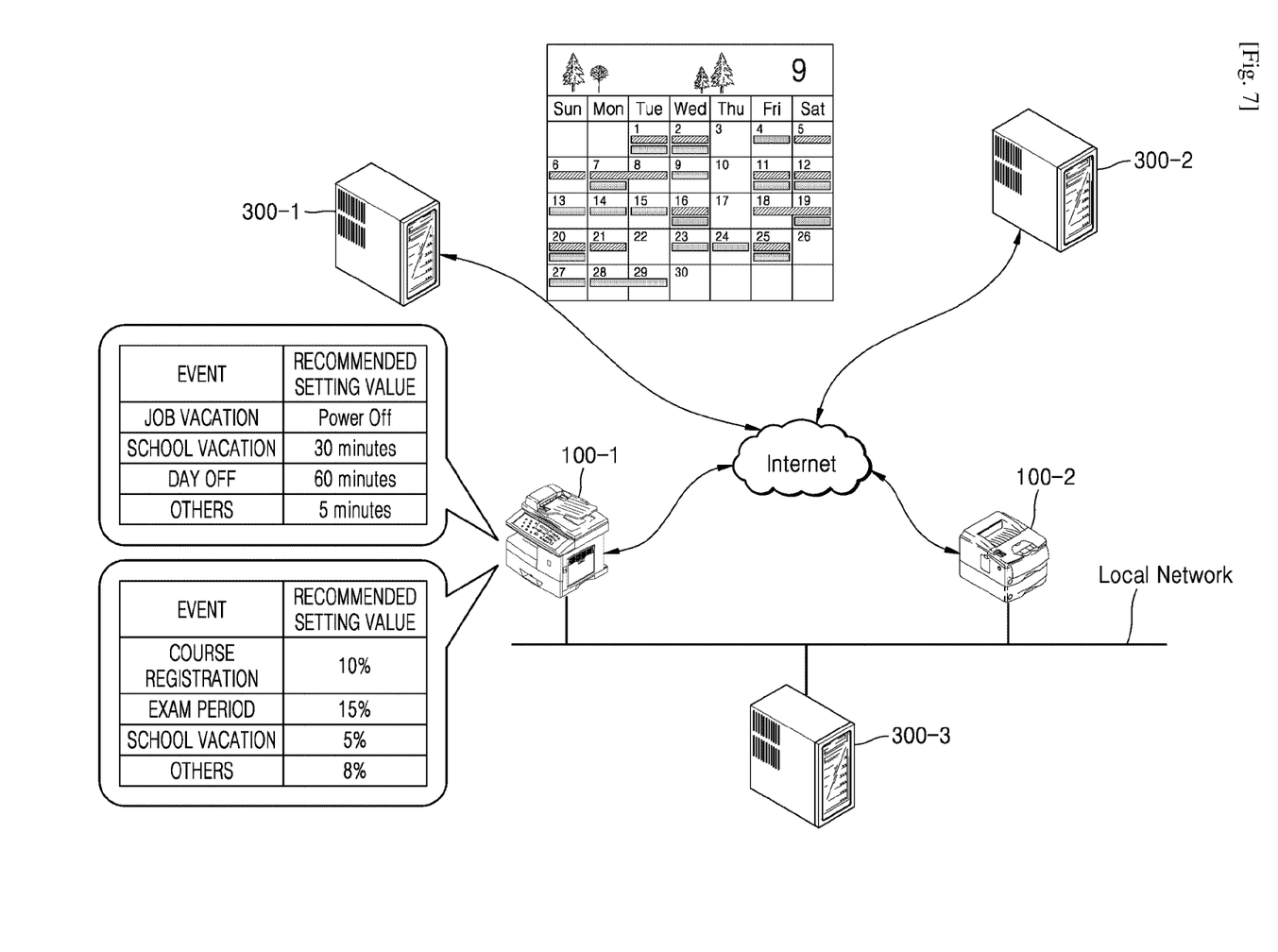
FIG. 7 is a view for describing an operation of modifying power save setting information or email notification setting information of an image forming apparatus based on user schedule information received from an Open API server included as an external server according to an example.

FIG. 7 is a view for describing an operation of modifying power save setting information or email notification setting information of an image forming apparatus based on user schedule information received from an Open API server included as an external server according to an example.

Referring to FIG. 7, an example is provided in which an external server 300-1 is an Open API server and context information is user schedule information. The external server 300-1, which is an Open API server, provides a scheduling service and may transmit user schedule information to the image forming apparatuses 100-1 and 100-2.

The image forming apparatuses 100-1 and 100-2 may determine a new setting value of power save setting information or email notification setting information based on user schedule information. When a previously set value of the power save setting information or the email notification setting information is different from the new setting value, the image forming apparatuses 100-1 and 100-2 may determine to modify the power save setting information or the email notification setting information. For example, the image forming apparatuses 100-1 and 100-2 may determine schedule data of a user from user schedule information received from the external server 300-1, and by using a table in which scheduled events and recommended setting values of the power save setting information or the email notification setting information corresponding to the scheduled events are matched, the image forming apparatuses 100-1 and 100-2 may set a new setting value of power save setting information or email notification setting information corresponding to the user's schedule data. In the example illustrated in FIG. 7, the image forming apparatuses 100-1 and 100-2 may determine a scheduled event such as a job vacation, a school vacation, a day off, an exam period, a course registration period, or the like from the schedule data of the user, and the image forming apparatuses 100-1 and 100-2 may determine a new setting value of power save setting information or email notification setting information according to the determined scheduled event. When a previously set value of the power save setting information or the email notification setting information is different from the new setting value, the image forming apparatuses 100-1 and 100-2 may determine to modify the power save setting information or the email notification setting information. In the example illustrated in FIG. 7, when a scheduled event is determined as job vacation, a new setting value of power save setting information is determined as "Power Off." Thus, when the previously set value is not "Power Off," the image forming apparatuses 100-1 and 100-2 may modify the power save setting information. In the example illustrated in FIG. 7, when a scheduled event is determined to be an exam period, by considering an increase in the usage frequency of the image forming apparatuses 100-1 and 100-2, a relatively high value, "15%", is set as a new setting value of the email notification setting information, and thus, when a previously set value is not "15%," the image forming apparatuses 100-1 and 100-2 may modify the email notification setting information.

The image forming apparatuses 100-1 and 100-2 may receive a plurality of pieces of user schedule information from the external server 300-1, which is an Open API server, and may predict a context pattern about user schedule information based on the received plurality of pieces of user schedule information. For example, the image forming apparatuses 100-1 and 100-2 may receive user schedule information corresponding to one month from the external server 300-1, which is an Open API server, and analyze schedules from the received plurality of pieces of user schedule information to predict whether a schedule is a temporary schedule or a long-term schedule, whether a particular schedule is periodically repeated, or the like. The image forming apparatuses 100-1 and 100-2 may determine whether to modify power save setting information or email notification setting information based on the predicted context pattern.

The image forming apparatuses 100-1 and 100-2 may modify connection conditions for a connection from the image forming apparatuses 100-1 and 100-2 to the external server 300-1, which is an Open API server, based on details of received user schedule information or a frequency with which received user schedule information is updated in the external server 300-1. For example, when details of received user schedule information is a schedule for a very short period or a frequency with which the user schedule information is updated in the external server 300-1, which is an Open API server, increases, the image forming apparatuses 100-1 and 100-2 may set a short connection period of a connection from the image forming apparatuses 100-1 and 100-2 to the external server 300-1. On the contrary, the image forming apparatuses 100-1 and 100-2 may set a long connection period for a connection from the image forming apparatuses 100-1 and 100-2 to the external server 300-1, which is an Open API server, when details of received user schedule information are about a long-term schedule or a frequency with which user schedule information is updated in the external server 300-1 decreases.

Figure 8:
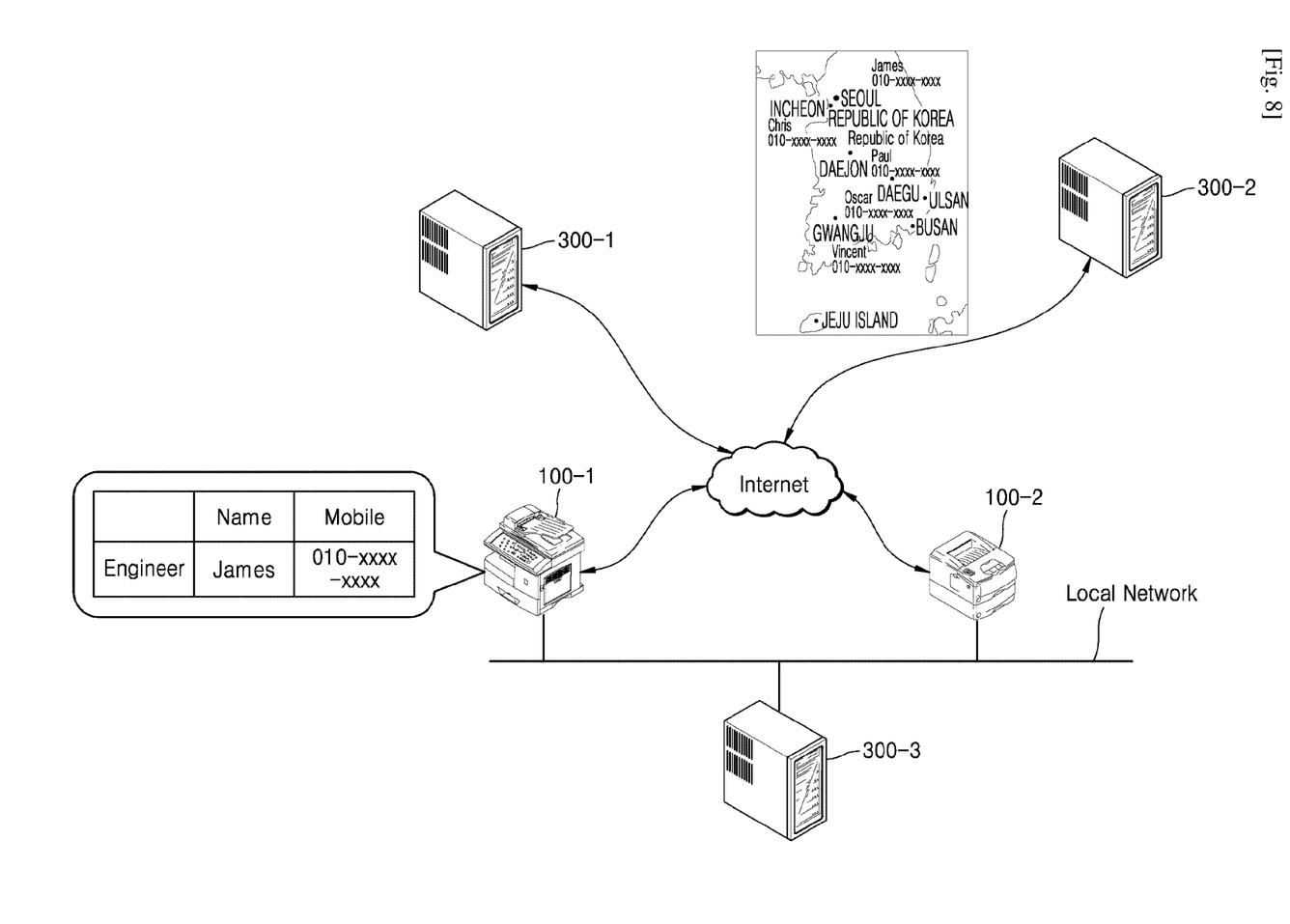
FIG. 8 is a view for describing an operation of modifying service setting information of an image forming apparatus based on service-related information received from a cloud server included as an external server according to an example.

FIG. 8 is a view for describing an operation of modifying service setting information of an image forming apparatus based on service-related information received from a cloud server included as an external server according to an example.

Referring to FIG. 8, an example is provided in which an external server 300-2 is a cloud server, and context information is service-related information. The external server 300-2, which is a cloud server, provides a product-related service, such as an after-sales service, and may transmit service-related information to image forming apparatuses 100-1 and 100-2.

The image forming apparatuses 100-1 and 100-2 may determine a new setting value of service setting information based on service-related information, and when a previously set value of the service setting information is different from the new setting value, the image forming apparatuses 100-1 and 100-2 may determine to modify the service setting information. For example, the image forming apparatuses 100-1 and 100-2 may determine current engineer data from service-related information received from the external server 300-2, which is a cloud server, and by using a table storing engineer information, the image forming apparatuses 100-1 and 100-2 may determine a new setting value of service setting information corresponding to a current engineer. In the example illustrated in FIG. 8, a current engineer in Seoul is "James," and thus the image forming apparatuses 100-1 and 100-2 may determine "James" and his contact information as a new setting value of service setting information. When a previously set value of the service setting information is different from the new setting value, the image forming apparatuses 100-1 and 100-2 may determine to modify the service setting information. In the example illustrated in FIG. 8, as a new setting value is determined as "James" and his contact information, when a previously set value is not "James" and his contact information, the image forming apparatuses 100-1 and 100-2 may modify the service setting information.

The image forming apparatuses 100-1 and 100-2 may modify connection conditions for a connection from the image forming apparatuses 100-1 and 100-2 to the external server 300-2, which is a cloud server, based on details of received service-related information or a frequency with which received service-related information is updated in the external server 300-2. For example, the image forming apparatuses 100-1 and 100-2 may set a short connection period for a connection from the image forming apparatuses 100-1 and 100-2 to the external server 300-2, which is a cloud server, when details of received service-related information has changed frequently or a frequency with which service-related information is updated in the external server 300-2 increases. On the contrary, the image forming apparatuses 100-1 and 100-2 may set a long connection period for a connection from the image forming apparatuses 100-1 and 100-2 to the external server 300-2, which is a cloud server, when details of received service-related information are hardly changed or a frequency with which service-related information is updated in the external server 300-2 decreases.

Figure 9:
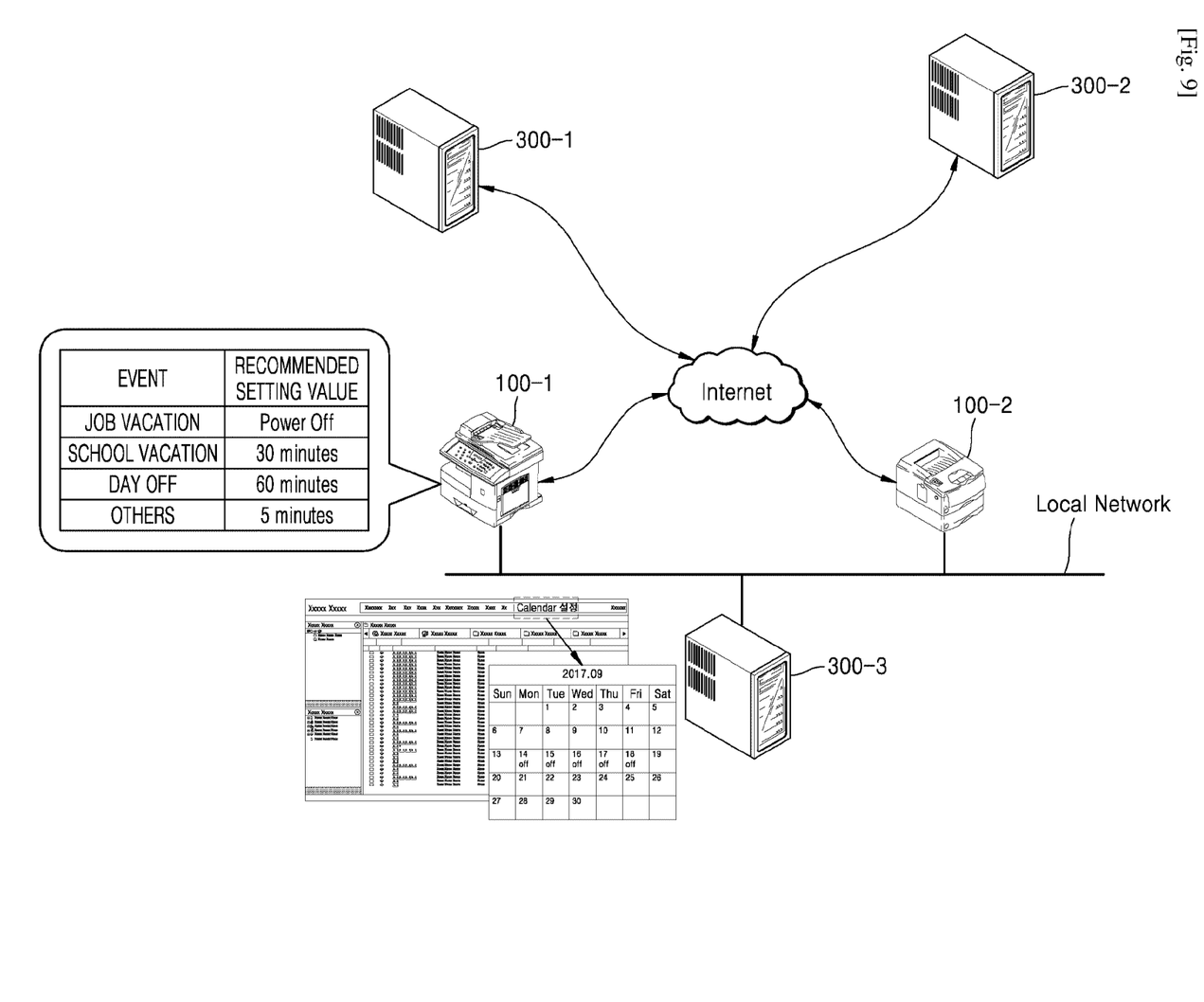
FIG. 9 is a view for describing an operation of modifying power save setting information of an image forming apparatus based on schedule information of a local network environment received from a local network server included as an external server according to an example.

FIG. 9 is a view for describing an operation of modifying power save setting information of an image forming apparatus based on schedule information of a local network environment received from a local network server included as an external server according to an example.

Referring to FIG. 9, an example is provided in which an external server 300-3 is a local network server, and context information is schedule information of a local network environment. The external server 300-3, which is a local network server, provides a local network environment management service, and may transmit schedule information of the local network environment to image forming apparatuses 100-1 and 100-2.

The image forming apparatuses 100-1 and 100-2 may determine a new setting value of power save setting information of the image forming apparatus 100 based on schedule information of a local network environment. When a previously set value of the power save setting information is different from the new setting value, the image forming apparatuses 100-1 and 100-2 may determine to modify the power save setting information. For example, the image forming apparatuses 100-1 and 100-2 may determine schedule data of an administrator from schedule information of a local network environment received from the external server 300-3, which is a local network server, and by using a table in which scheduled events and recommended setting values of power save setting information corresponding to the scheduled events are matched, the image forming apparatuses 100-1 and 100-2 may determine a new setting value of power save setting information corresponding to the schedule data of the administrator. In the example illustrated in FIG. 9, the image forming apparatuses 100-1 and 100-2 may determine a scheduled event such as job vacation, school vacation, day off, or the like from the schedule data of the administrator, and the image forming apparatuses 100-1 and 100-2 may determine a new setting value of power save setting information according to the determined schedule event. When a previously set value of the power save setting information is different from the new setting value, the image forming apparatuses 100-1 and 100-2 may determine to modify the power save setting information. In the example illustrated in FIG. 9, when a scheduled event is determined as job vacation, a new setting value of the power save setting information is determined as "Power Off," and thus, the image forming apparatuses 100-1 and 100-2 may modify the power save setting information when a previously set value is not "Power Off."

The image forming apparatuses 100-1 and 100-2 may receive a plurality of pieces of schedule information of a local network environment from the external server 300-3, which is a local network server, and predict a context pattern about schedule information of the local network environment based on the received plurality of pieces of schedule information of the local network environment. For example, the image forming apparatuses 100-1 and 100-2 may receive schedule information of a local network environment corresponding to one month from the external server 300-3, which is a local network server, and analyze schedules from the received plurality of pieces of schedule information of the local network environment to predict as to whether a schedule is a temporary schedule or a long-term schedule, whether a particular schedule is periodically repeated, or the like. The image forming apparatuses 100-1 and 100-2 may determine whether to modify the power save setting information based on the predicted context pattern.

The image forming apparatuses 100-1 and 100-2 may modify connection conditions from the image forming apparatuses 100-1 and 100-2 to the external server 300-3, which is a local network server, based on details of received schedule information of the local network server or a frequency with which received schedule information is updated in the external server 300-3. For example, the image forming apparatuses 100-1 and 100-2 may set a short connection period for a connection from the image forming apparatuses 100-1 and 100-2 to the external server 300-3, which is a local network server, when details of received schedule information of the local network environment corresponds to a very short schedule or the frequency with which schedule information of the local network environment is updated in the external server 300-3 increases. On the contrary, the image forming apparatuses 100-1 and 100-2 may set a long connection period for a connection from the image forming apparatuses 100-1 and 100-2 to the external server 300-3, which is a local network server, when details of received schedule information of the local network environment corresponds to a long-term schedule or a frequency with which schedule information of the local network environment is updated in the external server 300-3 decreases.

Figure 10:
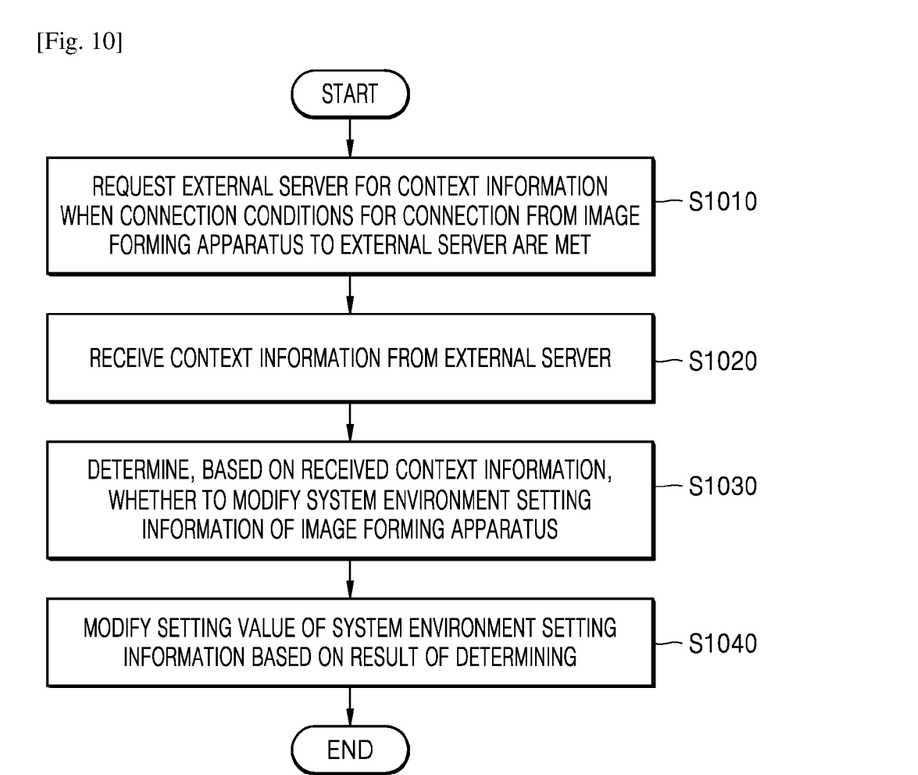
FIG. 10 is a flowchart of a method of managing an image forming apparatus by using an external server according to an example.

FIG. 10 is a flowchart of a method of managing an image forming apparatus by using an external server according to an example.

Referring to FIG. 10, when connection conditions for a connection from the image forming apparatus 100 to the external server 300 are met, the image forming apparatus 100 may request the external server 300 for context information in operation 1010.

A setting screen regarding a system environment setting service may be provided to the user interface device 110 of the image forming apparatus 100, and information about connection from the image forming apparatus 100 to the external server 300 may be received via the setting screen. Information about a connection from the image forming apparatus 100 to the external server 300 may include at least one of a connection condition for a connection from the image forming apparatus 100 to the external server 300, an address of the external server 300, information indicating whether a system environment setting service is used or not, or the like. The connection conditions for a connection from the image forming apparatus 100 to the external server 300 may also be modified based on context information received from the external server 300 or a frequency with which received context information is updated in the external server 300.

In operation 1020, the image forming apparatus 100 may receive context information from the external server 300.

In operation 1030, the image forming apparatus 100 may determine whether to modify system environment setting information of the image forming apparatus 100 based on the received context information. The image forming apparatus 100 may predict a context pattern based on a plurality of pieces of context information received from the external server 300 and determine whether to modify the system environment setting information based on the predicted context pattern.

According to an example, when the external server 300 is an Open API server, and context information is weather information, the image forming apparatus 100 may determine a new setting value of device environment setting information based on the weather information, and when a previously set value of the device environment setting information is different from the new setting value, the image forming apparatus 100 may determine to modify the device environment setting information.

According to another example, when the external server 300 is an Open API server, and context information is user schedule information, the image forming apparatus 100 may determine a new setting value of power save setting information of the image forming apparatus 100 based on the user schedule information, and when a previously set value of the power save setting information is different from the new setting value, the image forming apparatus 100 may determine to modify the power save setting information.

According to another example, when the external server 300 is an Open API server, and context information is user schedule information, the image forming apparatus 100 may determine a new setting value of email notification setting information of the image forming apparatus 100 based on the user schedule information, and when a previously set value of the email notification setting information is different from the new setting value, the image forming apparatus 100 may determine to modify the email notification setting information.

According to another example, when the external server 300 is a cloud server, and context information is service-related information, the image forming apparatus 100 may determine a new setting value of service setting information of the image forming apparatus 100 based on the service-related information, and when a previously set value of the service setting information is different from the new setting value, the image forming apparatus 100 may determine to modify the service setting information.

According to another example, when the external server 300 is a local network server, and context information is schedule information of a local network environment, the image forming apparatus 100 may determine a new setting value of power save setting information of the image forming apparatus 100 based on the schedule information of the local network environment, and when a previously set value of the power save setting information is different from the new setting value, the image forming apparatus 100 may determine to modify the power save setting information.

In operation 1040, the image forming apparatus 100 may modify a setting value of system environment setting information based on a result of determination.

The examples described above can be implemented as computer-executable instructions and as a computer-readable recording medium that stores data. At least one of the instructions and data may be stored as program code, and when executed by a processor, may generate a predefined program module to perform a predefined operation. Examples of a non-transitory computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks (SSD), and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. For example, the computer-readable recording medium may be the memory 140 of the image forming apparatus 100 or the memory of the user interface device 110.

While various examples have been particularly shown and described, it will be understood by those of ordinary skill in the art that various changes in form and details may be made therein without departing from the spirit and scope of the examples as defined by the appended claims. The examples thus should be considered in a descriptive sense only and not for purposes of limitation. The scope of the present disclosure is defined not by the description of the examples but by the appended claims, and all differences within the scope will be construed as being included in the disclosure.

The invention claimed is:

1. An image forming apparatus comprising:
   a communicator to:
      request an external server for context information when a connection condition for a connection from the image forming apparatus to the external server is met, and
      receive the context information from the external server;
   a memory to store computer-executable instructions; and
   a controller to:
      predict a context pattern by using a plurality of pieces of context information received from the external server,
      determine, based on the predicted context pattern, whether to modify system environment setting information of the image forming apparatus, and
      modify a setting value of the system environment setting information based on a determining result.

2. The image forming apparatus of claim 1, wherein the controller modifies the connection conditions based on the received context information or a frequency with which the received context information is updated in the external server.

3. The image forming apparatus of claim 1, further comprising a user interface device to:
   provide a setting screen regarding a system environment setting service, and
   receive, via the provided setting screen, information about a connection from the image forming apparatus to the external server.

4. The image forming apparatus of claim 3, wherein the information about the connection from the image forming apparatus to the external server comprises a connection conditions from the image forming apparatus to the external server, an address of the external server, or information about whether the system environment setting service is used or not.

5. The image forming apparatus of claim 1,
   wherein, when the external server comprises an Open API server and the context information comprises weather information, the controller determines a new setting value of device environment setting information of the image forming apparatus based on the weather information, and
   wherein, when a previously set value of the device environment setting information is different from the new setting value, the controller determines to modify the device environment setting information.

6. The image forming apparatus of claim 1,
   wherein, when the external server comprises an Open API server and the context information comprises user schedule information, the controller determines a new setting value of power save setting information of the image forming apparatus based on the user schedule information, and
   wherein, when a previously set value of the power save setting information is different from the new setting value, the controller determines to modify the power save setting information.

7. The image forming apparatus of claim 1,
   wherein, when the external server comprises an Open API server and the context information comprises user schedule information, the controller determines a new setting value of email notification setting information of the image forming apparatus based on the user schedule information, and
   wherein, when a previously set value of the email notification setting information is different from the new setting value, the controller determines to modify the email notification setting information.

8. The image forming apparatus of claim 1,
   wherein, when the external server comprises a cloud server and the context information comprises service-related information, the controller determines a new setting value of service setting information of the image forming apparatus based on the service-related information, and
   wherein, when a previously set value of the service setting information is different from the new setting value, the controller determines to modify the service setting information.

9. The image forming apparatus of claim 1,
   wherein, when the external server comprises a local network server and the context information comprises schedule information of a local network environment, the controller determines a new setting value of power save setting information of the image forming apparatus based on schedule information of the local network environment, and
   wherein, when a previously set value of the power save setting information is different from the new setting value, the controller determines to modify the power save setting information.

10. A method of managing an image forming apparatus, the method comprising:
   requesting an external server for context information;
   when a condition for connecting the image forming apparatus to the external server is met;

receiving the context information from the external server;

predicting a context pattern by using a plurality of pieces of context information received from the external server;

determining whether to modify system environment setting information of the image forming apparatus based on the predicted context pattern; and modifying a setting value of the system environment setting information based on a result of the determining.

11. The method of claim 10, further comprising:

modifying the connection conditions based on the received context information or a frequency with which the received context information is updated in the external server.

12. The method of claim 10, further comprising:

providing a setting screen regarding a system environment setting service to a user interface device of the image forming apparatus; and receiving information about a connection from the image forming apparatus to the external server via the provided setting screen, wherein the information about the connection from the image forming apparatus to the external server comprises a connection condition for connecting the image forming apparatus to the external server, an address of the external server, or information about whether the system environment setting service is used or not.

13. The method of claim 10, wherein, when the external server comprises an Open API server and the context information comprises weather information, the determining comprises:

determining a new setting value of device environment setting information of the image forming apparatus based on the weather information; and determining to modify the device environment setting information when a previously set value of the device environment setting information is different from the new setting value.

14. The method of claim 10, wherein, when the external server comprises an Open API server and the context information comprises user schedule information, the determining comprises:

determining a new setting value of power save setting information of the image forming apparatus based on the user schedule information; and determining to modify the power save setting information when a previously set value of the power save setting information is different from the new setting value.

15. The method of claim 10, wherein, when the external server comprises an Open API server and the context information comprises user schedule information, the determining comprises:

determining a new setting value of email notification setting information of the image forming apparatus based on the user schedule information; and when a previously set value of the email notification setting information is different from the new setting value, determining to modify the email notification setting information.

16. The method of claim 10, wherein when the external server comprises a cloud server and the context information comprises service-related information, the determining comprises:

determining a new setting value of service setting information of the image forming apparatus based on the service-related information; and when a previously set value of the service setting information is different from the new setting value, determining to modify the service setting information.

17. The method of claim 10, wherein, when the external server comprises a local network server and the context information comprises schedule information of a local network environment, the determining comprises:

determining a new setting value of power save setting information of the image forming apparatus based on the schedule information of the local network environment; and when a previously set value of the power save setting information is different from the new setting value, determining to modify the power save setting information.

18. A non-transitory computer-readable recording medium having instructions embodied thereon for managing an image forming apparatus, the non-transitory computer-readable recording medium comprising:

instructions for requesting an external server for context information; when a condition for connecting the image forming apparatus to the external server is met;

instructions for receiving the context information from the external server;

instructions for predicting a context pattern by using a plurality of pieces of context information received from the external server;

instructions for determining whether to modify system environment setting information of the image forming apparatus based on the predicted context pattern; and instructions for modifying a setting value of the system environment setting information based on a result of the determining.

* * * * *